United States Patent Office 3,592,921
Patented July 13, 1971

3,592,921
TREATMENT OF INTESTINAL HELMINTHIASIS WITH CYCLOPENTENE-1,3-DIONES
Alvin Wagner and James W. Kessel, Rochester, N.Y., assignors to Eastman Kodak Company, Rochester, N.Y.
No Drawing. Filed Dec. 16, 1968, Ser. No. 784,176
Int. Cl. A61k 27/00
U.S. Cl. 424—330      22 Claims

ABSTRACT OF THE DISCLOSURE

Domestic animals afflicted with intestinal helminthiasis are treated with cyclopentene-1,3-diones having hydrogen or halogen atoms at the 4 and 5 positions and substituted at the 2 position with benzylidene, dihalomethylene, or diaminomethylene radicals. The active agent can be administered in pill or capsule form or as a drench but is preferably incorporated in the feed and/or water supplied to the animal.

---

This invention relates in general to animal husbandry and in particular to the control of internal parasites in domestic animals. More specifically, this invention relates to a novel method and composition for treatment of intestinal helminthiasis in domestic animals.

Helminthiasis refers to infestation with, or disease caused by, parasitic worms and is a very common and widespread condition which afflicts both household and farm animals with resulting economic losses amounting to many millions of dollars per year. Extensive research on the control of this disease has been conducted for many years and a wide variety of chemical compounds have been suggested for use as anthelmintic agents. However, the search for effective and commercially practical anthelmintics has proved to be a most difficult undertaking in view of the many exacting requirements that must be met. Thus, for example, an ideal anthelmintic agent for veterinary use should be available at low cost, toxic to a broad spectrum of helminths, effective for a wide variety of host animals, non-injurious to the host animal at the anthelmintically effective dosages, and in a form which is easily administered and adaptable to use in a manner which renders feasible the treatment of large or small numbers of animals. At present, the effectiveness and reliability of known anthelmintic agents for veterinary use is not entirely satisfactory and undesirable side effects or toxicity to the host animal are frequently encountered.

It is toward the objective of providing compounds for treatment of intestinal helminthiasis which are highly active and well tolerated and which are amenable to low cost preparation and ease of administration that the present invention is directed.

In accordance with this invention, intestinal helminthiasis in domestic animals is treated by the method comprising administering to the animal an anthelmintically effective amount of a cyclopentene-1,3-dione having hydrogen or halogen atoms at the 4 and 5 positions and substituted at the 2 position with benzylidene, dihalomethylene, or diaminomethylene radicals, as hereinafter described in full detail. Although any of the customary methods of administering anthelmintic agents known to the art may be employed, in its preferred aspects the invention pertains to incorporating the aforesaid cyclopentene-1,3-diones in the feed and/or water supplied to the animal.

The cyclopentene-1,3-diones employed in the method of this invention are compounds of the formula:

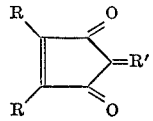

wherein each R is independently selected from the group consisting of hydrogen and halogen and R′ is a member selected from the group consisting of benzylidene radicals of 7 to 16 carbon atoms, dihalomethylene radicals, and diaminomethylene radicals of the formula $=C(NR''R'')_2$ wherein each R″ is independently selected from the group consisting of hydrogen, phenyl, and lower alkyl (i.e. alkyl of 1 to 5 carbon atoms).

As employed herein, and in the appended claims, the term "benzylidene radical" is intended to mean either an unsubstituted benzylidene group or a benzylidene group bearing one or more substituents in the ortho, meta or para positions on the ring. Of particular interest for the purposes of this invention are the cyclopentene-1,3-diones of the above formula wherein R′ is a member selected from the group consisting of benzylidene, phenyl-substituted benzylidene, halo-substituted benzylidene, para-nitro-substituted benzylidene, lower-alkyl-substituted benzylidene (the term "lower alkyl" being used to mean alkyl of 1 to 5 carbon atoms), lower-alkoxy-substituted benzylidene (the term "lower alkoxy" being used to mean alkoxy of 1 to 5 carbon atoms), and lower-dialkylamino-substituted benzylidene (the term "lower dialkylamino" being used to mean dialkylamino in which each alkyl group independently contains 1 to 5 carbon atoms).

Exemplary of specific radicals within the contemplation of this invention which are designated by the symbol R′ as hereinabove defined are the following radicals:

benzylidene
phenylbenzylidene
chlorobenzylidene
bromobenzylidene
iodobenzylidene
dichlorobenzylidene
dibromobenzylidene
nitrobenzylidene
ethylbenzylidene
isopropylbenzylidene
isopentylbenzylidene
methoxybenzylidene
dimethoxybenzylidene
ethoxybenzylidene
isopentoxybenzylidene
dimethylaminobenzylidene
diethylaminobenzylidene
methylethylaminobenzylidene
dichloromethylene
dibromomethylene
diaminomethylene
bis-(dimethylamino)methylene
bis-(methylethylamino)methylene
dianilinomethylene and the like.

Illustrative examples of cyclopentene-1,3-diones within the generic definition presented hereinabove include the following compounds:

2-benzylidene-4-cyclopentene-1,3-dione
4,5-dichloro-2-benzylidene-4-cyclopentene-1,3-dione
2-(p-phenylbenzylidene)-4-cyclopentene-1,3-dione
2-(p-bromobenzylidene)-4-cyclopentene-1,3-dione
2-(p-iodobenzylidene)-4-cyclopentene-1,3-dione
2-(p-chlorobenzylidene)-4-cyclopentene-1,3-dione
2-(p-nitrobenzylidene)-4-cyclopentene-1,3-dione
2-(p-isopropylbenzylidene)-4-cyclopentene-1,3-dione
2-(p-methoxybenzylidene)-4-cyclopentene-1,3-dione
2-(m-methoxybenzylidene)-4-cyclopentene-1,3-dione
4,5-dichloro-2-(p-methoxybenzylidene)-4-cyclopentene-1,3-dione
2-(p-dimethylaminobenzylidene)-4-cyclopentene-1,3-dione 4,5-dichloro-2-(p-dimethylaminobenzylidene)-4-cyclopentene-1,3-dione 4,5-dichloro-2-(dichloromethylene)-4-cyclopentene-1,3-dione 4,5-dichloro-2-(dianilinomethylene)-4-cyclopentene-1,3-dione, and the like.

The cyclopentene-1,3-diones described hereinabove in which R' is a benzylidene radical of 7 to 16 carbon atoms can be prepared by condensing 4-cyclopentene-1,3-dione, or 4-cyclopentene-1,3-dione substituted in the 4 and/or 5 position with a halogen atom, with the appropriate aromatice aldehyde in the presence of an acid. For example, 2-benzylidene-4-cyclopentene-1,3-dione can be prepared by reacting 4-cyclopentene-1,3-dione with benzaldehyde in the presence of concentrated sulfuric acid and 4,5-dichloro - 2 - (p - methoxybenzylidene)-4-cyclopentene-1,3-dione can be prepared by reacting 4,5-dichloro-4-cyclopentene-1,3-dione with p-methoxybenzaldehyde in the presence of concentrated sulfuric acid. An illustrative procedure is to dissolve 0.1 mole of 4-cyclopentene-1,3-dione (or a 4 and/or 5 halo-substituted 4-cyclopentene-1,3-dione) and 0.2 mole of the aromatic aldehyde in 400 milliliters of glacial acetic acid, add 4 milliliters of concentrated sulfuric acid, heat the resulting mixture at reflux for 3 hours, cool, pour into 1 liter of water and extract four times with 200 milliliter portions of methylene chloride, combine the extracts, wash three times with 100 milliliter portions of brine, dry over anhydrous magnesium sulfate, evaporate to obtain a crude product, and purify by repeated recrystallization. A second illustrative procedure is to add 0.1 mole of 4-cyclopentene-1,3-dione (or a 4 and/or 5 halo-substituted 4-cyclopentene-1,3-dione) 0.5 mole of the aromatic aldehyde, and 75 milliliters of boron trifluoride etherate to 250 milliliters of ether, heat in a water bath and reflux for 1 hour, cool, wash several times with 200 milliliter portions of brine, dry over anhydrous magnesium sulfate, evaporate to obtain a crude product, and purify by repeated recrystallization.

The cyclopentene-1,3-diones described hereinabove in which R' is a halomethylene radical can be prepared by reacting a hexahalocyclopentadiene with a hexahalopropene to obtain the corresponding hexahalodihalomethylenecyclopentene and then treating with sulfuric acid to obtain the corresponding 1,3-dione, for example, hexachlorocyclopentadiene can be reacted with hexachloropropene to give 1,2,3,3,5,5-hexachloro-4-(dichloromethylene)cyclopentene which can be treated with sulfuric acid to give 4,5-dichloro-2-(dichloromethylene)-4-cyclopentene-1,3-dione; while those in which R' is a diaminomethylene radical of the formula =C(NR''R'')$_2$ can be prepared by reacting a 2-dihalomethylene-4-cyclopentene-1,3-dione with the appropriate amine, for example, 4,5-dichloro - 2 - (dichloromethylene)-4-cyclopentene-1,3-dione can be reacted with aniline to give 4,5-dichloro-2-(dianilinomethylene)-4-cyclopentene-1,3-dione.

For further details of the reactions involved in the preparation of the cyclopentene-1,3-diones employed in the practice of this invention, reference is made to the following publications:

C. H. De Puy and P. R. Well, J.A.C.S. 82, 2909 (1962)
A. Roedig and H. Ziegler, Ber. 94, 1800 (1961)
E. Yagren and G. Vavags, Doklady Akad. Nauk., S.S.S.R. 133, 588 (1960)
E. T. McBee et al., J.A.C.S. 77, 4379 (1955)
A. Roedig, Ann. 569, 161 (1950)

The method of this invention finds application in the treatment of domestic animals, such as dogs, cats, sheep, goats, cattle, swine and poultry, which are afflicted with intestinal helminths, such as tapeworms.

Treatment with the cyclopentene-1,3-diones described herein can be effected in any suitable manner known to the art for administering anthelmintic agents which are solids at ordinary temperatures. For example, the active agent can be administered to the animal in the form of pills, tablets, capsules or boluses, it can be formulated as a solution or dispersion in a suitable vehicle and administered by drench, or it can incorporated in the drinking water and/or food supplied to the animal. The active agent can be administered alone or in combination with suitable carriers, diluents, fillers, thickeners, disintegrating agents, bactericidal agents, sporicidal agents, colorants, and the like, and, if desired, it may be combined with other therapeutic agents utilized in animal husbandry. To facilitate the formulation of tablets, the active agent can be mixed with conventional binding agents such as acacia, gelatin, or polyvinylpyrrolidone. For administration by drench, the active agent can be dispersed in an aqueous medium containing thickening agents, such as the cellulose ethers, and emulsifying or dispersing agents. A particularly convenient method of administration consists in incorporating the active agent into the animal's feed rations in such amounts as will provide a daily minimum intake sufficient to achieve the desired result and, accordingly, preferred compositions within the contemplation of this invention are compositions comprising an animal feedstuff containing an anthelmintically effective amount of one or more of the hereinbefore described cyclopentene-1,3-diones. For this mode of administration, the cyclopentene-1,3-dione should be finely ground and intimately dispersed throughout the feed.

As previously indicated, it is within the contemplation of this invention to administer the cyclopentene-1,3-dione to the animal in any suitable manner and in any anthelmintically effective amount, although, of course, excessively large amounts which might cause harm to the animal should be avoided. The optimum dosage will vary with the particular compound used, the type of animal, the particular species of helminth involved, and the manner of administration, but can be determined without undue difficulty by anyone of ordinary skill in the art. Where the active agent is incorporated in the feed, the concentration used will typically be within the range from about 0.01 to about 1 percent by weight of the feed and more usually from about 0.1 to about 0.5 percent. For the use of tablets, or administration by drench, a dosage of from about 25 to about 1000 milligrams per kilogram of body weight is ordinarily suitable, with preferred dosages being in the range from about 100 to about 500 milligrams per kliogram.

The method of this invention is particularly advantageous by virtue of the fact that while the compositions disclosed are highly effective in treating intestinal helminthiasis they are safe to use and they function in such a manner that undesirable side effects are at a minimum.

The invention is further illustrated by the following examples of its practice.

Examples 1–15

In each of Examples 1 to 15, five mice which had been previously exposed to *Hymenolepis nana* eggs per os were fed a diet containing the anthelmintic agent for five days ad libitum, fasted for one day, and then necropsied. To prepare the diet, the anthelmintic agent was mixed with casein and ground with a mortar and pestle, admixed with "Purina Lab Chow" which had been freshly ground in an attrition mill, and then further ground with a mortar and pestle to ensure that the anthelmintic agent was thoroughly dispersed. The amount of anthelmintic agent incorporated in the diet was either 0.5 or 0.1 percent by weight as hereinafter specified. The control diet employed was identical to the test diet, except that no anthelmintic agent was included, and was fed to two groups of five mice each.

At autopsy, the mice were killed with chloroform and the peritoneal cavity was opened. To examine for the presence of *Hymenolepis nana*, the posterior four to six inches of the small intestine was removed and placed in a finger bowl with a small amount of tap water. The intestine was then slit and the contents examined against a black background and, if no tapeworms were seen, further examined under a dissecting microscope. If all of the mice in the test group were clear of *Hymenolepis nana*, activity of the compound tested is designated herein as "complete," while if there were tapeworms present but the worm burden was obviously less than in the control group, atcivity of the compound tested is designated herein as "partial." The results obtained are summarized in Table I.

In addition to the activity against the tapeworm *Hymenolepis nana* illustrated by the data in Table I, activity has also been observed with respect to other helminths, for example, the pinworms *Syphacia obvelata* and *Aspicularis tetraptera*.

each of these levels. In each instance, however, all of the anthelmintic agent for a given day was administered in a single dose. Untreated controls were run with both the one-day and three-day groups and sham-dosed controls (mice dosed with water containing 0.5 percent carboxymethyl cellulose and 0.2 percent polyoxyethylene sorbitan monooleate) were also run with the three-day groups. At the end of the test period, the mice were fasted for one day, killed with chloroform, autopsied, and examined for *Hymenolpis nana* in the same manner as described in regard to Examples 1 to 15. The results obtained are summarized in Table II with the activity of the anthelmintic agent be-

TABLE I

| Example Number | Anthelmintic agent | Percentage in diet | Activity rating |
|---|---|---|---|
| 1 | 2-benzylidene-4-cyclopentene-1,3-dione | 0.5 | Complete. |
|  |  | 0.1 | Do. |
| 2 | 4,5-dichloro-2-benzylidene-4-cyclopentene-1,3-dione | 0.5 | Partial. |
| 3 | 2-(p-phenylbenzylidene)-4-cyclopentene-1,3-dione | 0.5 | Complete. |
| 4 | 2-(p-bromobenzylidene)-4-cyclopentene-1,3-dione | 0.5 | Do. |
| 5 | 2-(p-iodobenzylidene)-4-cyclopentene 1,3-dione | 0.5 | Partial. |
| 6 | 2-(p-chlorobenzylidene)-4-cyclopentene-1,3-dione | 0.5 | Complete. |
|  |  | 0.1 | Partial. |
| 7 | 2-(p-nitrobenzylidene)-4-cyclopentene-1,3-dione | 0.5 | Complete. |
| 8 | 2-(p-isopropylbenzylidene)-4-cyclopentene-1,3-dione | 0.5 | Do. |
| 9 | 2-(p-methoxybenzylidene)-4-cyclopentene-1,3-dione | 0.5 | Do. |
|  |  | 0.1 | Partial. |
| 10 | 2-(m-methoxybenzylidene)-4-cyclopentene-1,3-dione | 0.5 | Complete. |
| 11 | 4,5-dichloro-2(p-methoxybenzylidene)-4-cyclopentene-1,3-dione | 0.5 | Do. |
| 12 | 2-(p-dimethylaminobenzylidene)-4-cyclopentene-1,3-dione | 0.5 | Do. |
| 13 | 4,5-dichloro-2-(p-dimethylaminobenzylidene)-4-cyclopentene-1,3-dione | 0.5 | Dot |
|  |  | 0.1 | Partial. |
| 14 | 4,5-dichloro-2-(dichloromethylene)-4-cyclopentenle-1,3-dione | 0.5 | Complete. |
| 15 | 4,5-dichloro-2-(dianilinomethylene)-4-cyclopentene-1,3-dione | 0.5 | Do. |
|  |  | 0.1 | Partial. |

Examples 16–27

In each of Examples 16 to 27, five mice which had been ing designated in the same manner as hereinbefore described.

TABLE II

| Example Number | Anthelmintic agent | Dosage, mg./kg./day | Days | Activity rating |
|---|---|---|---|---|
| 16 | 2-benzylidene-4-cyclopentene-1,3-dione | 500 | 3 | Complete. |
|  |  | 500 | 1 | Do. |
|  |  | 100 | 3 | Partial. |
|  |  | 100 | 1 | Do. |
| 17 | 2-(p-phenylbenzylidene)-4-cyclopentene-1,3-dione | 500 | 3 | Complete. |
|  |  | 500 | 1 | Partial. |
| 18 | 2-(p-bromobenzylidene)-4-cyclopentene-1,3-dione | 500 | 3 | Complete. |
|  |  | 500 | 1 | Partial. |
| 19 | 2-(p-chlorobenzylidene)-4-cyclopentene-1,3-dione | 500 | 3 | Complete. |
|  |  | 500 | 1 | Do. |
|  |  | 100 | 3 | Do. |
|  |  | 100 | 1 | Partial. |
| 20 | 2-(p-nitrobenzylidene)-4-cyclopentene-1,3-dione | 500 | 3 | Complete. |
|  |  | 500 | 1 | Do. |
|  |  | 100 | 3 | Partial. |
| 21 | 2-(p-isopropylbenzylidene)-4-cyclopentene-1,3-dione | 500 | 3 | Complete. |
|  |  | 500 | 1 | Do. |
|  |  | 100 | 3 | Do. |
|  |  | 100 | 1 | Do. |
|  |  | 50 | 3 | Partial. |
| 22 | 2-(p-methoxybenzylidene)-4-cyclopentene-1,3-dione | 500 | 3 | Complete. |
|  |  | 500 | 1 | Do. |
|  |  | 100 | 3 | Do. |
|  |  | 100 | 1 | Do. |
|  |  | 50 | 3 | Partial. |
|  |  | 50 | 1 | Complete. |
| 23 | 2-(m-methoxybenzylidene)-4-cyclopentene-1,3-dione | 500 | 3 | Do. |
|  |  | 500 | 1 | Do. |
|  |  | 100 | 3 | Do. |
|  |  | 100 | 1 | Parial. |
|  |  | 50 | 3 | Do. |
|  |  | 50 | 1 | Do. |
| 24 | 4,5-dichloro-2-(p-methoxybenzylidene)-4-cyclopentene-1,3-dione | 500 | 3 | Complete. |
| 25 | 2-(p-dimethylaminobenzylidene)-4-cyclopentene-1,3-dione | 500 | 3 | Do. |
|  |  | 500 | 1 | Partial. |
| 26 | 4,5-dichloro-2-(p-dimethylaminobenzylidene)-4-cyclopentene-1,3-dione | 500 | 3 | Do. |
| 27 | 4,5-dichloro-2-(dichloromethylene)-4-cyclopentene-1,3-dione | 500 | 3 | Complete. |
|  |  | 500 | 1 | Do. | previously exposed to *Hymenolepis nana* eggs per os were treated by preparing the anthelmintic agent under test as a dispersion in a liquid vehicle and administering it by stomach tube. To prepare the dispersion, the anthelmintic agent was added to water containing 0.5 percent carboxymethyl cellulose as a thickener and 0.2 percent polyoxyethylene sorbitan monooleate as an emulsifying agent. The mice were dosed at either 5000 milligrams of anthelmintic agent per kilogram of body weight per day (mg./kg./day) or at 100 mg./kg./day or at 50 mg./kg./day, with both one-day and three-day tests being conducted at The invention has been described in detail with particular reference to preferred embodiments thereof, but it will be understood that variations and modifications can be effected within the spirit and scope of the invention.

We claim:

1. A method of treating intestinal *Hymenolepis nana*, *Syphacia obvelata, and Aspicularis tetraptera* in domestic animals which comprises orally administering to the animal an amount in the range from about 0.01 to about 1 percent by weight of feed or from about 25 to about 1000 milligrams per day per kilogram of body weight of a cyclopentene-1,3-dione of the formula:

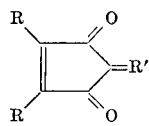

wherein each R is independently selected from the group consisting of hydrogen and halogen, and R' is a member selected from the group consisting of benzylidene, phenyl-substituted benzylidene, halo-substituted benzylidene, para-nitro-substituted benzylidene, lower alkyl-substituted benzylidene, lower-alkoxy-substituted benzylidene, lower-dialkylamino - substituted benzylidene, dihalomethylene radicals, and diaminomethylene radicals of the formula $=C(NR''R'')_2$ wherein each R'' is independently selected from the group consisting of hydrogen, phenyl, and lower alkyl.

2. The method as described in claim 1 wherein each R is hydrogen.

3. The method as described in claim 1 wherein each R is chlorine.

4. The method as described in claim 1 wherein the cyclopentene-1,3-dione is 2-benzylidene-4-cyclopentene-1,3-dione.

5. The method as described in claim 1 wherein the cyclopentene-1,3-dione is 4,5-dichloro-2-benzylidene - 4-cyclopentene-1,3-dione.

6. The method as described in claim 1 wherein the cyclopentene-1,3-dione is 2 - (p-phenylbenzylidene) - 4-cyclopentene-1,3-dione.

7. The method as described in claim 1 wherein the cyclopentene-1,3-dione is 2 - (p-bromobenzylidene) - 4-cyclopentene-1,3-dione.

8. The method as described in claim 1 wherein the cyclopentene-1,3-dione is 2 - (p - iodobenzylidene)-4-cyclopentene-1,3-dione.

9. The method as described in claim 1 wherein the cyclopentene-1,3-dione is 2-(p-chlorobenzylidene)-4-cyclopentene-1,3-dione.

10. The method as described in claim 1 wherein the cyclopentene1,3-dione is 2 - (p-nitrobenzylidene)-4-cyclopentene-1,3-dione.

11. The method as described in claim 1 wherein the cyclopentene-1,3-dione is 2 - (p-isopropylbenzylidene)-4-cyclopentene-1,3-dione.

12. The method as described in claim 1 wherein the cyclopentene-1,3-dione is 2 - (p-methoxybenzylidene)-4-cyclopentene-1,3-dione.

13. The method as described in claim 1 wherein the cyclopentene-1,3-dione is 2 - (m-methoxybenzylidene)-4-cyclopentene-1,3-dione.

14. The method as described in claim 1 wherein the cyclopentene-1,3-dione is 4,5 - dichloro-2-(p-methoxybenzylidene)-4-cyclopentene-1,3-dione.

15. The method as described in claim 1 wherein the cyclopentene-1,3-dione is 2 - (p - dimethylaminobenzylidne)-4-cyclopentene-1,3-dione.

16. The method as described in claim 1 wherein the cyclopentene-1,3-dione is 4,5-dichloro - 2 - (p - dimethylaminobenzylidene)-4-cyclopentene-1,3-dione.

17. The method as described in claim 1 wherein the cyclopentene-1,3-dione is 4,5-dichloro-2-(dichloromethylene)-4-cyclopentene-1,3-dione.

18. The method as described in claim 1 wherein the cyclopentene-1,3-dione is 4,5-dichloro-2-(dianilinomethylene)-4-cyclopentene-1,3-dione.

7etaoin etaoi etto eta oeta

19. A veterinary composition for control of intestinal *Hymenolepis nana, Syphacia obvelata,* and *Aspicularis tetraptera* comprising an animal feedstuff containing an amount in the range of from about 0.1 to about 1 percent by weight of feedstuff of a cyclopentene-1,3-dione of the formula:

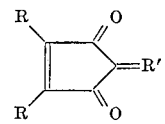

wherein each R is independently selected from the group consisting of hydrogen and halogen, an R' is a member selected from the group consisting of benzylidene, phenyl-substituted benzylidene, halo-substituted benzylidene, para-nitro-substituted benzylidene, lower-alkyl-substituted benzylidene, lower-alkoxy-substituted benzylidene, lower-dalkylamino - substituted benzylidene, dihalomethylene radicals, and diaminomethylene radicals of the formula $=C(NR''R'')_2$ wherein each R'' is independently selected from the group consisting of hydrogen, phenyl, and lower alkyl.

20. A veterinary composition as described in claim 19 wherein each R is hydrogen.

21. A veterinary composition as described in claim 19 wherein each R is chlorine.

22. A veterinary composition as described in claim 19 wherein said cyclopentene-1,3-dione is 2-benzylidene-4-cyclopentene-1,3-dione.

References Cited
UNITED STATES PATENTS 2,722,497  11/1955  Newcomer _____ 424—325

SAM ROSEN, Primary Examiner

U.S. Cl. X.R.

424—325, 330

PO-1050
(5/69)

UNITED STATES PATENT OFFICE
CERTIFICATE OF CORRECTION

Patent No. 3,592,921           Dated July 13, 1971

Inventor(s) Alvin Wagner and James W. Kessel

It is certified that error appears in the above-identified patent and that said Letters Patent are hereby corrected as shown below:

Column 8, line 5, "idne" should read --idene--;
           line 15, delete the entire line;
           line 19, "0.1" should read --0.01--;
           line 33, "dalkylamino" should read
                   --dialkylamino--.

Signed and sealed this 28th day of December 1971.

(SEAL)
Attest:

EDWARD M. FLETCHER, JR.          ROBERT GOTTSCHALK
Attesting Officer               Acting Commissioner of Patents